JOHN T. FANNING.

Improvement in Joint Ends for Sheet-Metal Pipes.

No. 115,588.

Patented June 6, 1871.

WITNESSES.

Geo. C. Ripley
H. H. Burnham

INVENTOR.

John T. Fanning.

UNITED STATES PATENT OFFICE.

JOHN T. FANNING, OF NORWICH, CONNECTICUT.

IMPROVEMENT IN JOINT ENDS FOR SHEET-METAL PIPES.

Specification forming part of Letters Patent No. 115,588, dated June 6, 1871.

I, JOHN T. FANNING, of Norwich, Connecticut, have invented a new and Improved Joint End for Sheet-Metal Pipes.

This invention has for its object the production of an improved pipe, especially adapted for holding a cement lining; and consists in providing the ordinary sheet-metal pipe with cast-iron ends of proper form, as will be fully described hereinafter.

Figure 1:
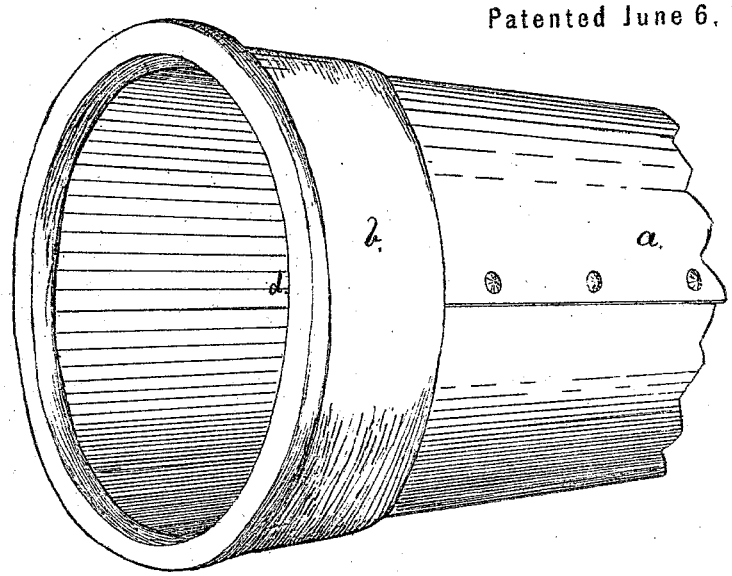
Figure 2:
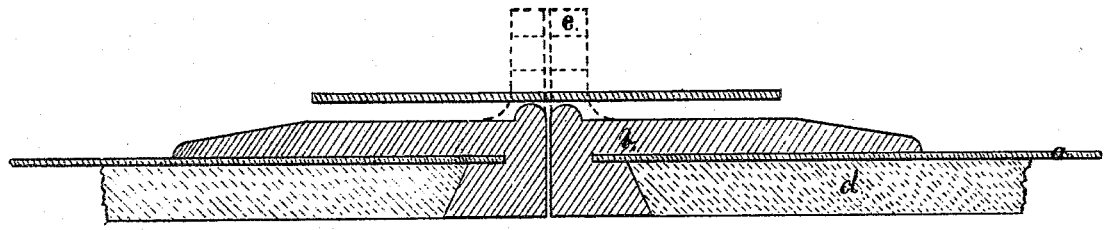
Figure 3:
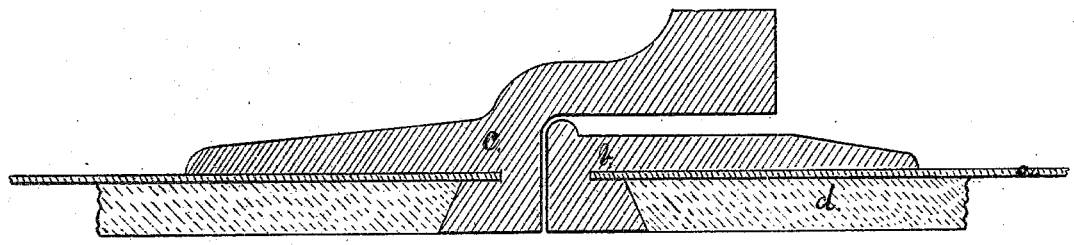

In the drawing, Figure 1 is a perspective of a pipe end with a spigot-ferrule cast thereon. Fig. 2 is a section through the abutting ends of two pipes having spigot-ferrules thereon when placed within a sleeve and ready to receive a calking of lead or other material; flanges which may be used, if preferred, being also shown by the dotted lines. Fig. 3 is a section through the abutting ends of two pipes having respectively spigot and socket ferrules cast thereon, ready to receive their calking.

To enable others skilled in the art to make and use my invention, I will now proceed to describe fully its construction and manner of operation.

$a$ represents a sheet-metal pipe, constructed in the usual well-known manner. $b$ represents a ferrule having a spigot end for insertion into the corresponding socket end $c$ of the adjacent pipe. The ends $b$ $c$ of the pipe are cast onto the sheet-metal part $a$ in any suitable manner. If desired, the ends of the latter may be splayed, perforated, indented, or otherwise properly manipulated, for the purpose of securing a more perfect union between the parts. Each ferrule protects the ends of the sheet-metal pipe, and also projects inward beyond its edges sufficiently far to form a rabbet, against which the cement or other plastic pipe-lining may be finished. If desired, the ferrule may be constructed with flanges or other proper means for uniting the adjacent ends.

For the purpose of permitting a branch pipe to be attached to the main a proper socket may be cast around an opening cut in the side of the main pipe at any proper point. The socket-ferrule, of course, if desired, may be so formed that the axes of the joined pipes will be inclined to each other, and their ends made to lie in any given curved line. The joints formed by these ferrules may be filled with lead, if it is desired to make a flexible joint, or with any other proper packing.

By means of this construction I am enabled to obtain the advantages of both the sheet-metal and cast-iron pipes. By means of the cast ends I can use a packing of lead, or any other material which requires driving, without injury to the fragile cement lining of the pipe. The use of cements may be entirely dispensed with in the joints, and consequently the pipe may be permitted to expand, contract, or settle, without causing the joints to leak. The pipe also can be handled for transportation with much less danger of breaking the cement.

Having thus fully described my invention, what I claim as new, and desire to secure by Letters Patent, is—

As a new article of manufacture, a sheet-metal pipe provided with metal ends cast thereon, adapted to form the joints, as described.

JOHN T. FANNING.

Witnesses:
 HENRY H. BURNHAM,
 GEORGE C. RIPLEY.